United States Patent [19]

Guenthner et al.

[11] 4,446,270

[45] May 1, 1984

[54] VULCANIZING FLUOROCARBON ELASTOMERS WITH ONE OR A MIXTURE OF AROMATIC COMPOUNDS HAVING HYDROXYL AND OXYALLYL GROUPS

[75] Inventors: Richard A. Guenthner, White Bear Lake; David A. Stivers, St. Paul, both of Minn.

[73] Assignee: Minnesota Mining and Manufacturing Company, St. Paul, Minn.

[21] Appl. No.: 520,303

[22] Filed: Aug. 8, 1983

Related U.S. Application Data

[63] Continuation-in-part of Ser. No. 443,576, Nov. 22, 1982, abandoned.

[51] Int. Cl.$^3$ ................... C08L 27/22; C08L 27/16
[52] U.S. Cl. ...................... 524/433; 525/276; 525/266; 525/261; 525/260; 525/259; 525/256; 525/255; 524/436; 524/535
[58] Field of Search ................ 525/276, 266; 524/433

[56] References Cited

U.S. PATENT DOCUMENTS

| | | | |
|---|---|---|---|
| 2,968,649 | 1/1961 | Pailthorp | 260/80.5 |
| 3,051,677 | 8/1962 | Rexford | 260/29.6 |
| 3,318,854 | 5/1967 | Honn et al. | 260/87.7 |
| 3,655,727 | 4/1972 | Patel et al. | 260/470 P |
| 3,686,143 | 8/1972 | Bowman | 260/47 UP |
| 3,712,877 | 1/1973 | Patel et al. | 260/87.7 |
| 3,857,807 | 12/1974 | Kometani et al. | 260/29.6 F |
| 3,876,654 | 4/1975 | Pattison | 260/30.4 R |
| 3,933,732 | 1/1976 | Schmiegel | 260/42.27 |
| 4,129,617 | 12/1978 | Machi et al. | 525/276 |
| 4,233,421 | 11/1980 | Worm | 525/343 |
| 4,263,414 | 4/1981 | West | 525/102 |
| 4,353,961 | 10/1982 | Gotcher et al. | 525/276 |

OTHER PUBLICATIONS

West, A. C. and Holcomb, A. G., "Fluorinated Elastomers", Kirk–Othmer: Encyclopedia of Chemical Technology, vol. 8, 3rd Ed. J. Wiley & Sons, p. 500 (1979).
RMA Handbook OS-8/1977, Rubber Manufacturers Association, Inc., Washington, D.C.
Jahn, *J. Prakt Chem.*, 13, 188–196 (1961).
L. F. Feiser, *J. Amer. Chem. Soc.* 61 2206 (1939).

*Primary Examiner*—Carman J. Seccuro
*Attorney, Agent, or Firm*—Donald M. Sell; James A. Smith; William G. Ewert

[57] ABSTRACT

A composition comprising elastomeric copolymer gum of vinylidene fluoride and at least one terminally unsaturated monolefin comonomer and as a vulcanizing agent therefor a composition comprising one or a mixture of aromatic compounds having hydroxyl and oxyallyl groups directly bonded to aromatic ring-carbon atoms.

17 Claims, No Drawings

VULCANIZING FLUOROCARBON ELASTOMERS WITH ONE OR A MIXTURE OF AROMATIC COMPOUNDS HAVING HYDROXYL AND OXYALLYL GROUPS

This is a continuation in part of copending application Ser. No. 443,576, filed Nov. 22, 1982 now abandoned.

This invention relates to a method for vulcanizing fluorocarbon elastomers and vulcanizing agents for use therein. In another aspect, the invention relates to vulcanizable fluorocarbon elastomer compositions containing vinylidene fluoride polymers and vulcanizing adjuvants including a vulcanizing agent. In a further aspect, this invention relates to derivatives of aromatic polyhydroxy compounds, such as Bisphenols A and AF, said derivatives being useful in the vulcanization of fluorocarbon elastomers.

Among the polymers which are difficult to vulcanize are fluorocarbon elastomers prepared by the polymerization of vinylidene fluoride with other terminally unsaturated monoolefins, such as hexafluoropropene, 1-hydropentafluoropropene, chlorotrifluoroethylene, perfluoromethyl vinyl ether, and tetrafluoroethylene. These vulcanized or cured fluorinated polymers are elastomeric and also have other valuable properties, such as acid and base resistance, thermal stability, high tensile strength, low compression set, and good tear resistance. As such, the fluorocarbon elastomers have become polymers of choice for high temperature applications, such as rotating shaft seals for automotive applications, e.g., crankshafts.

Presently used conventional vulcanizing (or curing) agents for fluorocarbon elastomers include aromatic polyhydroxy compounds such as polyphenols, which are usually used in combination with certain vulcanization accelerators or co-curing agents, viz., organoonium compounds, e.g., ammonium, phosphonium and sulfonium compounds. See, for example, U.S. Pat. No. 3,655,727 (Patel et al), U.S. Pat. No. 3,712,877 (Patel et al), U.S. Pat. No. 3,857,807 (Kometani), U.S. Pat. No. 3,686,143 (Bowman), U.S. Pat. No. 3,933,732 (Schmiegel), U.S. Pat. No. 3,876,654 (Pattison), and U.S. Pat. No. 4,233,421 (Worm); and also see West, A. C. and Holcomb, A. G., "Fluorinated Elastomers", Kirk-Othmer; *Encyclopedia of Chemical Technology*, Vol. 8, 3rd Ed., John Wiley & Sons, Inc., pp. 500–515 (1979). In addition to the vulcanizing and co-curing agents, divalent metal oxides or hydroxides (as inorganic acid acceptors), fillers, processing aids, and other adjuvants are also conventionally employed in the vulcanization (or curing) of fluorocarbon elastomer compositions.

Although conventionally vulcanized fluorocarbon elastomers have many useful properties, as mentioned above, they generally do not have a modulus (the force required to stretch the elastomer to a certain length) as high as that desired for certain applications. Such applications where high modulus fluoroelastomers would be especially useful include engine and motor rotating shaft sealing rings (involving rubber-to-metal bonded constructions) for sealing lubricants and hydraulic fluids against leakage. Consequently, the presently used elastomer shaft seals often require some form of mechanical backup component, usually a wire spring, designed to maintain sealing pressure (see, for example the spring loaded rotating shaft seals in RMA Handbook OS-8/1977, published by Rubber Manufacturers Association, Inc., Washington, D.C.). In addition to these seal applications, high modulus fluoroelastomers would be useful in the fabrication of oil well drill bit seals, oil well ram packers and O-rings.

Though an approach to increasing the modulus of cured elastomers is the use of high levels of reinforcing fillers, such an approach often adversely affects the resiliency or rubbery nature of the elastomer.

This invention relates to the achievement of high modulus in cured fluorocarbon elastomers by an approach involving the use of a novel vulcanizing agent and which does not adversely affect the other desired properties of the cured fluoroelastomer.

Briefly, in one aspect to this invention, fluorocarbon elastomers are vulcanized (or cured) by using as a novel vulcanizing agent a composition comprising one or a mixture of aromatic compounds having hydroxyl and oxyallyl groups directly bonded to aromatic ring carbon atoms of said compounds.

The relative amounts of hydroxyl groups and allyl ether (or oxyallyl) groups in the vulcanizing agent and the amount of the latter to be used in vulcanizing the elastomers will be those amounts sufficient to obtain the desired state of cure in the cured elastomer and the desired properties thereof. Generally, the ratio of hydroxyl groups to allyl ether group in the vulcanizing agent composition will be in the range of 0.3/1 to 5/1, or even up to 10/1, preferably about 0.7/1 to 2/1. And the amount of the vulcanizing agent to be used will generally be in the range of about 0.2 to 10 parts, preferably about 0.5 to 6 parts, per 100 parts of elastomer to be vulcanized, larger amounts in these ranges generally producing a tighter state of cure.

The fluorocarbon elastomers or gums, e.g., copolymers of vinylidene fluoride and hexafluoropropene, can be compounded with the novel vulcanizing agent and the vulcanizing adjuvants commonly used in vulcanizing such elastomers, namely vulcanization accelerators or co-curing agents, such as the aforementioned organoammonium, phosphonium, and sulfonium compounds, e.g., triphenylbenzylphosphonium chloride, divalent metal oxides or hydroxides (as acid acceptors), e.g., MgO and Ca(OH)$_2$, and reinforcing agents or fillers, e.g., carbon black and silica. The thus compounded elastomer or gumstock can then be shaped, e.g. by molding or extruding, in the form of seals, O-rings, gaskets, etc., and heat applied to effect vulcanizing (or curing or crosslinking), to produce an elastomeric article with desirable modulus and other desirable properties, such as elongation, tensile strength, hardness, and tear strength. Rotating shaft seals made with such cured fluoroelastomer can thus be fabricated and used without the necessity of mechanical backup components such as the wire springs now commonly used to augment the seals made heretofore of fluoroelastomers with relatively lower modulus.

A broad class of the vulcanizing agents of this invention are compositions comprising compounds that can be represented by the general formula $$Ar(OR)_n \qquad \qquad I$$

where Ar is an n-valent aromatic nucleus, each R is the same or different and is selected from the group consisting of a hydrogen atom and an allyl group, and "n" is a number from 1 to 4, preferably 2 to 4, with the proviso that if in a select compound of general formula I "n" is 1, or "n" is 2, 3 or 4 and each R is the same, then said vulcanizing agent composition comprises said select compound in admixture with at least one other compound within the scope of general formula I which has at least one R group that is different from the R group of said select compound, the vulcanizing agent composition thus having aromatic hydroxyl and allyl ether substituents. For example, if the select compound is $C_6H_4(OCH_2CH=CH_2)_2$, it is used in admixture with a hydroxyl-substituted aromatic, e.g., $C_6H_4(OH)_2$, in the vulcanization of the fluoroelastomer gum; on the other hand if a compound of formula I has both hydroxyl and oxyallyl groups, e.g., the compound is $HO-C_6H_4-OCH_2CH=CH_2$, such compound can be used by itself as a vulcanizing agent.

The aromatic nucleus, Ar, of general formula I generally will have up to 3 benzene nuclei, which may be distinct, e.g., as in the case of phenylene, biphenylene, carbonyl bis(phenylene), and methylenebis(phenylene), or condensed, e.g., as in the case of naphthalene and anthracene. The aromatic nucleus may be substituted with other substituents which do not adversely affect the vulcanization function of the compound, such substituents being, for example, halogen atoms, e.g., chlorine, fluorine, or bromine, and such groups as oxy, alkyl, aryl, alkaryl, and aralkyl groups. Preferably, however, the aromatic nucleus is otherwise unsubstituted, that is, it is substituted only with the OR groups indicated in formula I. Also, the allyl group can be substituted with substituents, such as alkyl, e.g., methyl, and aryl, e.g., phenyl, provided they do not adversely affect the vulcanizing function of the compound. Preferably, however, the allyl group is unsubstituted.

A preferred subclass of the vulcanizing agents of this invention are those represented by the general formula

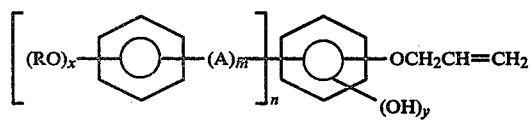

where R is a hydrogen atom or an allyl group, A is thio, oxy, sulfinyl, sulfonyl, or carbonyl moiety, or a divalent organic radical containing, for example, 1 to 13 carbon atoms, such as an aliphatic, cycloaliphatic, or aromatic radical which can be substituted by chlorine, fluorine, or bromine substitutents, x and y are zero, 1, or 2, and m and n are zero or 1, with the provisos:

(1) that if (n+y) is at least 1 and if y is zero, then x is at least 1 (so that the compounds of formula II are di- or poly-functional), and (2) that if in a select compound of formula II there is no hydroxyl substituent (which will be the case where y is zero, n is 1, x is zero or at least 1, and R is an allyl group) then said vulcanizing agent composition comprises said hydroxyl-free select compound in admixture with at least one other compound within the scope of formula II having at least one hydroxyl substituent (i.e., a compound where y is at least 1 or a compound where n is 1, x is at least 1, and at least one R is a hydrogen atom).

Particularly preferred compounds are those of formula II where x, m, and n are 1, y is zero, and A is a divalent aliphatic group, i.e., compounds of the formula

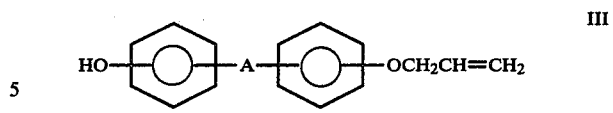

Species of this preferred group are

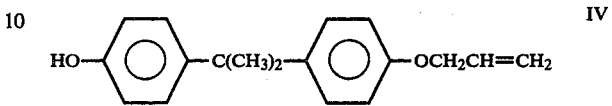

derived from Bisphenol A precursor, and

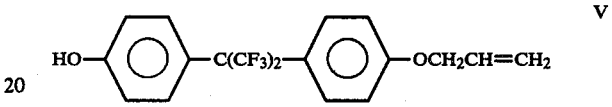

derived from Bisphenol AF precursor. These species will usually be prepared, and used in vulcanizing fluoroelastomer gums in accordance with this invention, in admixture with their unreacted bisphenol precursors and their para-substituted di-oxyallyl derivatives.

The polymers which are vulcanized or cured according to this invention are known linear, saturated, thermoplastic, fluorinated polymers or gums which can be classified as fluorocarbon elastomers. Such polymers are described, for example, in the aforementioned prior art, e.g., U.S. Pat. No. 4,233,421 (Worm) and U.S. Pat. No. 4,263,414 (Kolb). Many of these are commercially available, sold under trademarks as "Fluorel" and "Viton", and are copolymers of vinylidene fluoride and one or more other monoolefins (usually halogenated). Generally, at least 10% of their chain carbon atoms being $-CH_2-$ groups.

Among the polymers which may be vulcanized in accordance with this invention are the elastomeric copolymers of vinylidene fluoride with hexafluoropropene, chlorotrifluoroethylene, 2-chloropentafluoropropene, fluorinated methyl vinyl ether, tetrafluoroethylene, 1-hydropentafluoropropene, dichlorodifluoroethylene, trifluoroethylene, 1,1-chlorofluoroethylene, bromotrifluoroethylene, bromodifluoroethylene, or bromotetrafluorobutene. These monoolefins may be copolymerized with each other in groups of two or more. They may also be copolymers with other olefinic compounds such as ethylene or propylene. The preferred elastomers are copolymers of vinylidene fluoride with at least one terminally unsaturated fluoromonoolefin containing at least one fluorine atom substituent on each double-bonded carbon atom, each carbon atom of said fluoromonoolefin being substituted only with fluorine, chlorine, hydrogen, lower fluoroalkyl radical, or lower fluoroalkoxy radical, particularly hexafluoropropene, tetrafluoroethylene, chlorotrifluoroethylene, and 1-hydropentafluoropropene. Particularly preferred are the fluorinated elastomers produced by copolymerizing vinylidene fluoride with hexafluoropropene as described in U.S. Pat. Nos. 3,051,677, and 3,318,854, and those copolymers produced by copolymerizing vinylidene fluoride, hexafluoropropene, and tetrafluoroethylene as described in U.S. Pat. No. 2,968,649. The elastomeric copolymers of hexafluoropropene and vinylidene fluoride having between about 15 and about 50 mole percent hexafluoropropene, optionally with the addition of up to 30 mole percent tetrafluoroethylene, are illustrative of this preferred class. Mixtures or blends of fluorinated elastomers, e.g., of different viscosities, are also suitable.

The hydroxyl- and allyl ether-substituted aromatic compositions of this invention can be prepared by reacting sodium salts of the precursor polyhydroxy aromatic compounds with an allyl chloride or bromide in a solvent, such as ethyl alcohol, and then treating the resulting reaction product with acid. Alternatively, the polyhydroxy aromatic compound and allyl chloride or bromide can be reacted in a solvent, such as methyl ethyl ketone, in the presence of potassium carbonate. Such preparations are described by Jahn in *J. Prakt Chem.* 13 188–96 (1961) and by L. F. Feiser in *J. Amer. Chem. Soc.* 61 2206 (1939). The hydroxy, allyl ethers so prepared will be normally liquid or solid, their mixtures generally being low melting solids.

Representative aromatic polyhydroxyl precursors of the hydroxy, allyl ethers of this invention include hydroquinone, 2-methyl hydroquinone, 2,5-dimethyl hydroquinone, 2-t-butyl hydroquinone, resorcinol, 2-methyl resorcinol, 5-methyl resorcinol, 2,4-dibenzoylresorcinol, catechol, 2,4-dihydroxybenzoic acid ethyl ester, 2,4-dihydroxyacetophenone, 1,5-dihydroxynaphthalene, 9,10-dihydroxyanthracene, 1,4,9,10-tetrahydroxyanthracene, 3,6-dihydroxyxanthone, 2,6-dihydroxyanthraquinone, 4,4'-dihydroxydiphenylsulfoxide, 4,4'-dihydroxydiphenylsulfone (Bisphenol S), 1,1-cyclohexylidene-bis(4-hydroxybenzene), 2-chloro-1,4-cyclohexylene-bis(4-hydroxybenzene), 2,2-isopropylidene-bis(4-hydroxybenzene) (Bisphenol A), 2,2-hexafluoroisopropylidene-bis(4-hydroxybenzene) (Bisphenol AF), 2,4'-dihydroxybenzophenone, 4,4'-dihydroxybenzophenone, 2,2',4,4'-tetrahydroxybenzophenone, and 2-fluoro-1,4-phenylene-bis(4-hydroxybenzene). Bisphenol S, Bisphenol AF and Bisphenol A are preferred polyphenols for conversion to the allyl ethers of this invention.

Although not required to obtain desirably high modulus on curing the curable fluoroelastomer compositions of this invention, the presence of added aromatic hydroxy compounds above that present in the hydroxy, allyl ether product may be beneficial since they generally further increase the modulus of the cured fluoroelastomers of this invention. The amount of aromatic hydroxy compound which can be used in combination with the hydroxy, allyl ether product will depend on the properties desired in the cured fluoroelastomer, but generally the ratio of hydroxyl groups to allyl ether groups in the vulcanizing agent composition will not exceed 10/1, as indicated above.

The organo-onium compounds which can be used as co-curing agents or accelerators in the compounded fluorocarbon elastomer compositions of this invention are described in detail in the patents and references cited above.

Representative organo-onium compounds useful as co-curing agents include the following compounds or mixtures thereof: triphenylbenzyl phosphonium chloride, tributylallyl phosphonium chloride, tetrabutyl phosphonium captate, triethyloctadecyl phosphonium acetate, tetrabutyl ammonium hydroxide, tetramethyl ammonium hydroxide, hexabutylethylene diammonium dichloride, N,N-dipropylpiperidinium acetate, N-ethylpyridinium bromide, 1,4-phenylene dimethylene bis(triethyl ammonium)dichloride, 8-benzyl-1,8-diazabicyclo[5,4,0]-7-undecenium chloride, triphenyl sulfonium chloride, methyldiphenyl sulfonium tetrafluoroborate, and tritolysulfonium bromide.

The hydroxyl, allyl ether vulcanizing agent and the conventional organo-onium compound (in an amount of about 0.1 to 5 parts per 100 parts elastomer) are milled and dispersed into the fluorocarbon elastomer gum stock. Thus mixed, the elastomer composition can be stored at room temperature for extended periods, e.g., for a year or more. Just prior to curing, the conventional divalent metal oxide and/or hydroxide acid acceptors (each in an amount of about 0 to 25 parts per 100 parts elastomer, the sum being about 3 to 40 parts) are also added to the elastomer composition, the gumstock (in reactive association with said acid acceptors) now being curable. Other conventional compounding agents, such as carbon black (in an amount of 0 to 100 parts per 100 parts elastomer) and other fillers such as calcium carbonate and silica, pigments, and retarding agents can be milled into the gumstock. The hydroxyl, allyl ether compositions of this invention also generally act as processing aids, increasing the flow properties of the compounded gumstocks, and facilitate the release of the molded gumstocks from their molds.

In accordance with this invention, the desired amounts of the components of the vulcanizing system can be added to the unvulcanized fluorocarbon gumstock and intimately admixed or compounded therewith by employing any of the usual rubber mixing devices, such as Banbury mixers, roll mills, or any other convenient mixing device. The temperature of the mixture in the mixing device preferably should not be allowed to rise above about 120° C.

The compounded, curable gumstock can be extruded or pressed in a mold, and subsequently heated or baked in an oven. Pressing of the compounded gumstock (called "press cure") is usually conducted at a temperature between about 95° C. and about 230° C., preferably between about 150° C., and about 205° C. for a period of from one minute to about 15 hours, usually from five minutes to 30 minutes. A pressure of between about 700 kPa and about 20,600 kPa, preferably between about 3,400 kPa and about 6,800 kPa, is usually imposed on the compounded gumstock in the mold. The mold first may be coated with a release agent, such as a silicone oil, and prebaked. The molded vulcanizate is then usually "post cured" (oven cured) at a temperature between about 150° C. and about 315° C., usually at about 260° C. for a period of from about two hours to 50 hours or more depending on the cross-sectional thickness of the molded article. For thick sections, the temperature during the post cure is usually raised gradually from the lower limit of the range of the desired maximum temperature selected. For thinner sections, e.g., less than 5 mm, the section may be put into the oven at the desired maximum temperature. The maximum temperature used is preferably about 260° C. and is held at this value for about 24 hours or more.

The following examples are offered to aid in a better understanding of the present invention and are not to be unduly construed as limiting the scope thereof. In these examples, the parts referred to are parts by weight.

EXAMPLE 1

To a 3-neck, round bottom, borosilicate glass flask, fitted with stirrer, condenser, thermometer, and addition funnel, was added 228 g (1.0 mole) of 2,2-bis(4-hydroxyphenyl)propane (Bisphenol A), 400 ml ethyl alcohol solvent, and 216 g (1.0 mole) of 25 percent sodium methoxide in methyl alcohol. The reaction mixture was stirred and heated at 40° C. for 0.5 hours to form the partial sodium salt of Bisphenol A.

Allyl chloride (45.6 g) was added and the reaction mixture stirred and heated 1 hour, then an additional 45.6 g (total 1.2 mole) of allyl chloride was added and reflux continued for 5 hours. The flask was adapted for distillation and the excess allyl chloride and ethyl alcohol solvent were distilled off to a pot temperature of 90° C. at 25 torr.

To the reaction product left in the flask was added 400 ml water containing 40 g of concentrated hydrochloric acid and 200 ml of diisopropyl ether. The mixture was stirred well and the ether layer separated, washed with water and the ether removed by distillation to a pot temperature of 80° C. at 25 torr to yield 273 g of product. Gas-liquid chromatography of the trimethylsilyl derivative of a small sample of the reaction product showed it had the composition set forth in Table 1 where it is designated as Agent "a".

The above preparation was repeated, using one-half the amounts of reagents and solvents, in another run to yield a product whose composition is shown in Table 1 where it is designated Agent "e".

In a similar run, using 0.25 mole Bisphenol A, 0.5 mole sodium methoxide, and 0.6 mole allyl chloride, a product was produced having the composition shown in Table 1 where it is desiganted Agent "g".

A portion of the above reaction product designated Agent "a" was mixed with aqueous sodium hydroxide and diisopropyl ether, and the mixture shaken, the phases separated and the ether phase shaken with aqueous hydrochloric acid and the ether phase evaporated to yield a second allyl ether product, the composition of which is set forth in Table 1 where it is designated as Agent "b".

The above second allyl ether product was again treated with aqueous sodium hydroxide, extracted with methylene chloride and the organic layer stripped of solvent and the product (19 g), having the composition shown in Table 1 where it is designated Agent "f", was subjected to liquid chromatography on a silica gel column utilizing a 10:1 hexane/ethyl acetate solvent mixture to yield third and fourth products, one of which was a monoallyl ether derivative, whose composition is set forth in Table 1 where it is designated as Agent "h", the other product being a di-allyl ether derivative. A portion of the latter was mixed with an equal amount of Bisphenol A to give a product whose composition is set forth in Table 1 where it is designated Agent "p". Another portion of the derivative was mixed with phenol in a 1 to 2 ratio, this mixture being designated Agent "q" in Table 1.

EXAMPLE 2

Utilizing the apparatus of Example 1, 114 g (0.5 mole) Bisphenol A, 45.5 g (0.6 mole) allyl chloride, 100 g of methylethyl ketone (MEK) solvent, and 0.6 g of potassium iodide were placed in the flask. To this stirred mixture was added 69.1 g (0.45 mole) of potassium carbonate and the reaction mixture heated at 68°-87° C. The reaction mixture was cooled to room temperature, and 150 ml of cold water and 50 ml of diisopropyl ether were added. The mixture was shaken vigorously and the organic phase separated and shaken with 100 ml water containing hydrochloric acid. The organic phase was separated from the aqueous acid phase and solvents removed by distillation to a pot temperature of 80° C. at 25 torr to yield 139 g of product. Gas-liquid chromatography of the product showed it to have the composition set forth in Table 1 where it is designated as Agent "d".

The above preparation was essentially repeated to yield a product having the composition shown in Table 1 where it is designated Agent "w".

EXAMPLE 3

To 45 g (0.6 mole) of refluxing and stirred allyl chloride in a flask equipped as in Example 1 was added over a 3-hour period a solution prepared from 168 g (0.5 mole) of 2,2-bis(4-hydroxyphenyl)hexafluoropropane (Bisphenol AF), 150 ml ethyl alcohol, and 108 g (0.5 mole) of 25 percent sodium methoxide in methyl alcohol and reflux continued at 65° C. for 3 hours. The reaction mixture was cooled and the sodium chloride formed in the reaction was removed by filtration, the filtrate concentrated by distillation and the crude product shaken with aqueous hydrochloric acid and diisopropyl ether and the mixed allyl ether product isolated as in Example 1. The mixed allyl ether product (weight 191.5 g) had the composition shown in Table 1 where it is designated as Agent "j".

The above preparation was repeated, using twice the amounts of reagents and solvents and reversing the order of addition, to yield a product having the composition shown in Table 1 where it is designated Agent "l".

Aqueous sodium hydroxide extraction of a diisopropyl ether solution of 100 g of the above product Agent "j" yielded a product whose composition is set forth in Table 1 where it is designated as Agent "k".

EXAMPLE 4

Following the procedure of Example 2, 55 g (0.5 mole) hydroquinone, 45.6 g (0.6 mole) allyl chloride, 0.6 g potassium iodide and 69.1 g (0.45 mole) potassium carbonate were reacted in 50 ml of MEK, and the resulting reaction product weighing 29 g was isolated as described. Analysis by gas-liquid chromatography showed it had the composition set forth in Table 1 where it is designated as Agent "m".

EXAMPLE 5

Following the procedure of Example 2, 44 g (0.4 mole) resorcinol, 96.8 g (0.79 mole) allyl bromide, and 112 g (0.73 mole) potassium carbonate were reacted in 200 ml acetone and the allyl ether product isolated as described. The product weighing 65.5 g had the composition shown in Table 1 where it is designated as Agent "n". Fifty parts of this product was mixed with 50 parts of resorcinol to yield a product whose composition is set forth in Table 1 where it is designated as Agent "o".

The ratios of hydroxyl groups to allyl ether groups of the above-described Agents are set forth in Table 1A.

A number of commercially available fluorocarbon gums, whose compositions are set forth in Table 2, were compounded with various vulcanizing agents of this invention and certain conventional vulcanizing adjuvants in an otherwise convention manner described hereinbefore.

Samples of the compounded gumstocks were in the form of 150×150×1.8 mm sheets and were pressed at about 5 MPa at 175° C. for 10 minutes (except as indicated). After measurement of the indicated physical properties, portions of the samples were then post cured in an oven at 260° C. for 24 hours, and physical properties re-measured. Measurements were in accordance with ASTM D 412-80 using an Instron Tensile Tester, Method "A", using dumbbell samples cut from 1.8 mm sheet with Die "C". Tear strength was determined by ASTM D 624-73, Die "C". In compounding the gumstocks, the vulcanization accelerator (or co-curing agent) used was $(C_6H_5)_3(C_6H_5CH_2)P^+Cl^-$, the carbon black filler was "Thermax"MT (ASTM N990), the magnesium oxide was "Maglite" D, and the calcium hydroxide was reagent grade.

For purposes of comparison, certain compounded gumstocks were similarly prepared, cured, and tested using certain other materials as vulcanizing agents.

The foregoing work is summarized in Tables 3–6.

EXAMPLE 6

As shown in Table 3, various gums (of Table 2) were compounded with Agents "a" and "l" (of Table 1) of this invention. For purposes of comparison, their bisphenol precursors (known vulcanizing agents for fluorocarbon elastomer gums) were also compounded with gums in other runs denoted by "C". Table 3 also includes the results of testing the cured compounded gums.

The data in Table 3 show that the vulcanizing agents "a" and "l" (comprising the allyl ether blends of Bisphenol A and Bisphenol AF, respectively) yielded cured fluoroelastomers with high modulus (Runs 2, 4–10), whereas the free or precursor bisphenols (at the same curing agent level yield) yielded cured elastomers with poor properties and character (Runs 1C and 3C).

The data also show that the curing agent of this invention yielded high modulus, cured fluoroelastomer employing several different fluoroelastomer gums.

EXAMPLE 7

Agents "l" and "e" of Table 1 were compounded in some runs as the sole vulcanizing agent with a commercial fluorocarbon elastomer gum and in other runs those agents were admixture with added amounts of their bisphenol precursor. For comparison, the bisphenol precursors themselves were used as the sole vulcanizing agents for said gums. Results are summarized in Table 4.

The data of Table 4 also show that the vulcanizing agents of this invention yielded cured fluoroealstomers (Runs 3, 4, 6 and 7) with higher modulus than that resulting from using their precursor bisphenols (Runs 1C, 2C, and 5C). And a curing agent of this invention yielded even higher modulus when additional free bisphenol was added to the agent (Run 4).

EXAMPLE 8

Various allyl ether derivative products of Bisphenol A were used as vulcanizing agents. For comparison, the precursor, Bisphenol A, and the di-allyl ether of Bisphenol A were evaluated. Table 5 sets forth the runs and results.

The data of Table 5 show the vulcanizing agents were generally effective in yielding high modulus cured fluoroelastomers. Comparative cures using only the free bisphenol (Run 1C) or pure diallyl ether (Run 7C) gave blistered cured elastomer which could not be tested. The vulcanizing agent used in Run 5 gave a relatively low modulus elastomer, presumably because of its relatively low hydroxyl/allyl ether ratio, and such a product would not be as useful in applications requiring a high modulus.

EXAMPLE 9

The allyl ether derivatives of hydroquinone and resorcinol and a di-allyl ether of Bisphenol A mixed with phenol were compounded with a fluoroelastomer gum. For comparison, the propyl ether of Bisphenol A, 2-allylphenol, and an agent comprising principally the diallyl ether of resorcinol were also compounded with the fluoroelastomer. Results are shown in Table 6.

The data of Table 6 show the two allyl ethers of hydroquinone and resorcinol (Runs 1 and 5) and the di-allyl ether-phenol mixture gave high modulus cured fluoroelastomer. Comparative runs with a propyl ether blend of Bisphenol A (Run 2C), a mainly diallyl ether (Run 4C) and a non-ether allyl phenol (Run 3C) gave low modulus cured elastomer.

Various modifications and alternations of this invention will become apparent to those skilled in the art without departing from the scope and spirit of this invention.

TABLE 1

| Vulcanizing agent components | Amts. of components, wt % Agents | | | | | | | | |
|---|---|---|---|---|---|---|---|---|---|
| | "a" | "b" | "c" | "d" | "e" | "f" | "g" | "h" | "w" |
| HO—⟨O⟩—C(CH$_3$)$_2$—⟨O⟩—OH | 28.6 | 12.6 | 0 | 22.2 | 32 | 1 | 0.14 | 0 | 39.9 |
| HO—⟨O⟩—C(CH$_3$)$_2$—⟨O⟩—OCH$_2$CH=CH$_2$ | 44.5 | 55.4 | 61.3 | 47.8 | 35 | 64 | 17.3 | 99.9 | 43.5 |
| CH$_2$=CHCH$_2$O—⟨O⟩—C(CH$_3$)$_2$—⟨O⟩—OCH$_2$CH=CH$_2$ | 24.6 | 29.3 | 28.7 | 26.7 | 31 | 35 | 81.3 | 0 | 14.5 |
| | "j" | "k" | "l" | | | | | | |
| HO—⟨O⟩—C(CF$_3$)$_2$—⟨O⟩—OH | 37.2 | 2 | 27.1 | | | | | | |
| HO—⟨O⟩—C(CF$_3$)$_2$—⟨O⟩—OCH$_2$CH=CH$_2$ | 34.8 | 50 | 47.4 | | | | | | |

TABLE 1-continued

| Vulcanizing agent components | Amts. of components, wt % Agents |
|---|---|
| CH$_2$=CHCH$_2$O—⟨O⟩—C(CF$_3$)$_2$—⟨O⟩—OCH$_2$CH=CH$_2$ | 27.2  39.3  25.3 |

"m"

| | |
|---|---|
| HO—⟨O⟩—OH | 47 |
| HO—⟨O⟩—OCH$_2$CH=CH | 46 |
| CH$_2$=CHCH$_2$O—⟨O⟩—OCH$_2$CH=CH$_2$ | 4 |

"n"

| | |
|---|---|
| HO—⟨O⟩—OH (meta) | 1 |
| HO—⟨O⟩—OCH$_2$CH=CH$_2$ (meta) | 1 |
| CH$_2$=CHCH$_2$O—⟨O⟩—OCH$_2$CH=CH$_2$ (meta) | 97 |

"o"

| | |
|---|---|
| HO—⟨O⟩—OH | 50 |
| CH$_2$=CHCH$_2$O—⟨O⟩—OCH$_2$CH=CH$_2$ | 50 |

"p"

| | |
|---|---|
| HO—⟨O⟩—C(CH$_3$)$_2$—⟨O⟩—OH | 50 |
| CH$_2$=CHCH$_2$O—⟨O⟩—C(CH$_3$)$_2$—⟨O⟩—OCH$_2$CH=CH$_2$ | 50 |

"q"

| | |
|---|---|
| HO—⟨O⟩ | 67 |
| CH$_2$=CHCH$_2$O—⟨O⟩—C(CH$_3$)$_2$—⟨O⟩—OCH$_2$CH=CH$_2$ | 33 |

TABLE 1A

| Vulcanizing Agent of Table 1 | Ratio of hydroxyl to allyl ether groups in agent |
|---|---|
| "a" | 1.3 |
| "b" | 0.80 |
| "c" | 0.55 |
| "d" | 1.1 |
| "e" | 1.3 |
| "f" | 0.53 |
| "g" | 0.10 |
| "h" | 1.0 |
| "w" | 2.0 |
| "j" | 1.5 |
| "k" | 0.47 |
| "l" | 1.2 |
| "m" | 3.3 |
| "n" | 0.24 |

TABLE 1A-continued

| Vulcanizing Agent of Table 1 | Ratio of hydroxyl to allyl ether groups in agent |
|---|---|
| "o" | 1.7 |
| "p" | 1.4 |
| "q" | 6.5 |

TABLE 2

| Fluoroelastomer gum | Composition of gum, mole % | | | | | |
|---|---|---|---|---|---|---|
| | $C_2H_2F_2$ | $C_3F_6$ | $C_2F_4$ | $C_2ClF_3$ | $C_2HF_2Br$ | $C_4H_3F_4Br$ |
| A* | 80 | 20 | | | | |
| B | 61.5 | 19.2 | 19.2 | | | |
| C | 60 | 39 | | 1 | | |
| D | 78.8 | 20.9 | | | 0.3 | |
| E | 50 | 21 | 28.3 | | | 0.7 |

*In some instances (noted in the tables), equal parts of two 80/20 $C_2H_2F_2/C_3F_6$ copolymers of different Mooney viscosities were used.

TABLE 3

| | Run No. | | | | | | | | | |
|---|---|---|---|---|---|---|---|---|---|---|
| | 1(C) | 2 | 3(C) | 4 | 5 | 6 | 7 | 8 | 9 | 10 |
| Curable gumstock ingredients, parts | | | | | | | | | | |
| Fluoroelastomer gum$^a$: | | | | | | | | | | |
| A | 100 | 100$^d$ | 100$^d$ | 100$^d$ | 100$^d$ | 100$^d$ | | | | |
| B | | | | | | | 100 | | | |
| C | | | | | | | | 100 | | |
| D | | | | | | | | | 100 | |
| E | | | | | | | | | | 100 |
| Vulcanization accelerator | 0.5 | 0.5 | 0.5 | 0.5 | 0.5 | 0.5 | 0.5 | 0.5 | 0.5 | 0.5 |
| Carbon black | 30 | 30 | 30 | 30 | 30 | 30 | 30 | 30 | 30 | 30 |
| MgO | 6 | 6 | 6 | 6 | 6 | 6 | 6 | 6 | 6 | 6 |
| Ca(OH)$_2$ | 7.5 | 7.5 | 7.5 | 7.5 | 7.5 | 7.5 | 7.5 | 7.5 | 7.5 | 7.5 |
| Vulcanizing Agent: | | | | | | | | | | |
| Bisphenol AF | 4 | | | | | | | | | |
| Allyl ether of Bisphenol AF$^b$ | | 4 | | | | | | | | |
| Bisphenol A | | | 4 | | | | | | | |
| Allyl ether of Bisphenol A$^c$ | | | | 4 | 4 | 4 | 4 | 4 | 4 | 4 |
| Properties of Cured Gumstock | | | | | | | | | | |
| Press cure properties: | | | | | | | | | | |
| Tensile Strength, MPa | 1.59 | 10.3 | 1.76 | 8.89 | 8.89 | 10.9 | 5.58 | 3.83 | 8.76 | 5.24 |
| Elongation at break, % | 400 | 350 | 400 | 375 | 375 | 280 | 550 | 450 | 290 | 400 |
| Hardness, Shore A-2 | 70 | 72 | 73 | 76 | 76 | 78 | 78 | 79 | 79 | 78 |
| Modulus, 100%, MPa | B,W$^e$ | 3.69 | B,W | 3.27 | 3.27 | 5.41 | 3.24 | 2.93 | 4.45 | 4.14 |
| Tear Strength, Kg/cm | TP$^f$ | 20.0 | TP | 22.3 | 22.3 | 18.4 | 31.1 | 23.9 | 23.6 | 36.8 |
| Post cure Properties: | | | | | | | | | | |
| Tensile strength, MPa | TP | 15.5 | TP | 15.0 | 15.0 | 15.6 | 9.06 | 7.89 | 15.4 | 7.99 |
| Elongation at break, % | TP | 125 | TP | 105 | 105 | 110 | 160 | 200 | 100 | 120 |
| Hardness, Shore A-2 | TP | 80 | TP | 85 | 85 | 87 | 90 | 85 | 88 | 85 |
| Modulus, 100%, MPa | TP | 14.5 | TP | 14.0 | 14.0 | 14.5 | 6.99 | 5.58 | 15.4 | 7.10 |
| Tear strength, Kg/cm | TP | 14.1 | TP | 16.1 | 16.1 | 16.1 | 22.5 | 24.6 | 22.7 | 17.7 |

$^a$See Table 2 for composition of gums
$^b$See Agent "l" in Table 1 for composition
$^c$See Agent "a" in Table 1 for composition.
$^d$This gum was 50 parts of each of two gums (of different viscosities) whose compositions are designated A in Table 2.
$^e$"B,W" means vulcanizate was blistered and warped.
$^f$"TP" means vulcanizate was too poor to test its physical properties.

TABLE 4

| | Run No. | | | | | | |
|---|---|---|---|---|---|---|---|
| | 1(C) | 2(C) | 3 | 4 | 5(C) | 6 | 7 |
| Curable gumstock ingredients, parts | | | | | | | |
| Fluoroelastomer gum A$^a$ | 100 | 100 | 100 | 100 | 100 | 100 | 100 |
| Vulcanization accelerator | 1 | 1 | 0.5 | 0.5 | 0.5 | 0.5 | 0.5 |
| Carbon black | 30 | 30 | 30 | 30 | 30 | 30 | 30 |
| MgO | 3 | 3 | 6 | 6 | 6 | 6 | 6 |
| Ca(OH)$_2$ | 6 | 6 | 7.5 | 7.5 | 7.5 | 7.5 | 7.5 |
| Vulcanization agent: | | | | | | | |
| Bisphenol AF | 3.5 | 4.5 | | 0.5 | | | 0.5 |
| Allylether of Bisphenol AF$^b$ | | | 4 | 4 | | | |
| Bisphenol A | | | | | 4 | | |
| Allyl ether of Bisphenol A$^c$ | | | | | | 4 | 4 |
| Properties of Cured Gumstock | | | | | | | |
| Post cure properties: | | | | | | | |
| Tensile strength, MPa | 13.1 | 13.4 | 15.5 | 18.3 | B,TP | 14.9 | 16.3 |
| Elongation at break, % | 130 | 120 | 125 | 100 | B,TP | 125 | 80 |
| Hardness, Shore A-2 | 79 | 86 | 80 | 85 | B,TP | 84 | 88 |

TABLE 4-continued

| | Run No. | | | | | | |
|---|---|---|---|---|---|---|---|
| | 1(C) | 2(C) | 3 | 4 | 5(C) | 6 | 7 |
| Modulus, 100%, MPa | 9.72 | 11.0 | 14.5 | 18.3 | B,TP | 12.6 | — |

[a] This gum was 50 parts of each of two gums (of different viscosities) whose compositions are designated A in Table 2.
[b] See Agent "l" in Table 1 for composition.
[c] See Agent "e" in Table 1 for composition.
[d] "B,TP" means vulcanizate was blistered and too poor to test its physical properties.

TABLE 5

| | Run No. | | | | | | | |
|---|---|---|---|---|---|---|---|---|
| | 1(C) | 2 | 3 | 4 | 5 | 6 | 7(C) | 8 |
| Curable gumstock ingredients, parts | | | | | | | | |
| Fluoroelastomer gum A[a] | 100 | 100 | 100 | 100 | 100 | 100 | 100 | 100 |
| Vulcanization accelerator | 0.5 | 0.5 | 0.5 | 0.5 | 0.5 | 0.5 | 0.5 | 0.5 |
| Carbon black | 30 | 30 | 30 | 30 | 30 | 30 | 30 | 30 |
| MgO | 6 | 6 | 6 | 6 | 6 | 6 | 6 | 6 |
| Ca(OH)$_2$ | 7.5 | 7.5 | 7.5 | 7.5 | 7.5 | 7.5 | 7.5 | 7.5 |
| Vulcanization agent | 4 | 4 | 4 | 4 | 4 | 4 | 4 | 4 |
| Vulcanization agent used | Bisphenol A | "a" | "b" | "f" | "g" | "h" | Di-allyl ether[d] of Bisphenol A | "p" |
| Properties of Cured Gumstock | | | | | | | | |
| Press cure properties: | | | | | | | | |
| Tensile strength, MPa | 1.76 | 9.86 | 7.76 | 6.00 | 1.79 | 8.72 | TP | 10.1 |
| Elongation at break, % | 400 | 330 | 540 | 600 | 500 | 550 | TP | 245 |
| Hardness, Shore A-2 | 73 | 74 | 76 | 65 | 62 | 75 | TP | 78 |
| Modulus - 100%, MPa | B,W[b] | 4.07 | 2.69 | 2.00 | 1.59 | 2.59 | TP | 4.69 |
| Tear strength, Kg/cm | TP[c] | 21.2 | 23.3 | 37.9 | 16.6 | 22.1 | TP | 15.9 |
| Post cure properties: | | | | | | | | |
| Tensile strength, MPa | TP | 14.5 | 14.5 | 6.58 | 5.03 | 10.8 | TP | 14.6 |
| Elongation at break, % | TP | 100 | 125 | 95 | 150 | 80 | TP | 125 |
| Hardness, Shore A-2 | TP | 86 | 87 | 77 | 75 | 83 | TP | 84 |
| Modulus - 100%, MPa | TP | 14.5 | 12.6 | — | 4.00 | — | TP | 11.1 |
| Tear strength, Kg/cm | TP | 16.8 | 12.1 | 15.0 | 16.1 | TP | TP | 14.3 |

[a] This gum was 50 parts of each of two gums (of different viscosities) whose compositions are designated A in Table 2.
[b] "B,W" means cured gumstock was blistered and warped.
[c] "TP" means cured gumstock was too poor to test its physical properties; in Run 7(C) the cured gumstock was also blistered and undercured.
[d] This material was prepared as described in Example 1.

TABLE 6

| | Run Number | | | | | |
|---|---|---|---|---|---|---|
| | 1 | 2(C)[f] | 3(C) | 4(C) | 5 | 6 |
| Curable gumstock ingredients, parts | | | | | | |
| Fluoroelastomer gum A[a] | 100 | 100 | 100 | 100 | 100 | 100 |
| Vulcanization accelerator | 0.5 | 0.5 | 0.5 | 0.5 | 0.5 | 0.5 |
| Carbon black | 30 | 30 | 30 | 30 | 30 | 30 |
| MgO | 6 | 6 | 6 | 6 | 6 | 6 |
| Ca(OH)$_2$ | 7.5 | 7.5 | 7.5 | 7.5 | 7.5 | 7.5 |
| Vulcanization agent | 2 | 4 | 2.5 | 2.5 | 5 | 6 |
| Vulcanization agent ingredients, wt % | | | | | | |
| Mono-allyl ether of hydroquinone[b] | 100 | | | | | |
| Bisphenol A | | 30 | | | | |
| Mono-propyl ether of Bisphenol A | | 46.5 | | | | |
| Di-propyl ether of Bisphenol A | | 23.3 | | | | |
| 2-Allylphenol[c] | | | 100 | | | |
| Mono-allyl ether of resorcinol[d] | | | | 1 | | |
| Di-allyl ether of resorcinol[e] | | | | 97 | 50 | |
| Resorcinol | | | | 1 | 50 | |
| Di-allyl ether of Bisphenol A[g] | | | | | | 33 |
| Phenol | | | | | | 67 |
| Properties of cured gumstock | | | | | | |
| Press cure properties: | | | | | | |
| Tensile strength, MPa | 10.2 | 8.79 | 7.45 | 1.24 | 12.2 | 11.3 |
| Elongation at break, % | 160 | 335 | 600 | 300 | 170 | 525 |
| Hardness, Shore A-2 | 78 | 76 | 71 | 56 | 76 | 70 |
| Modulus - 100%, MPa | 7.45 | 3.90 | 2.38 | 1.07 | 8.03 | 2.82 |
| Tear Strength, Kg/cm | 13.4 | 18.9 | 27.5 | 13.7 | 14.8 | 32.1 |
| Post cure properties: | | | | | | |
| Tensile strength, MPa | 16.9 | 14.4 | 9.45 | 5.10 | 13.0 | 14.4 |
| Elongation at break, % | 105 | 210 | 225 | 175 | 60 | 110 |
| Hardness, Shore A-2 | 82 | 82 | 73 | 64 | 85 | 85 |
| Modulus, 100%, MPa | 14.9 | 5.96 | 4.27 | 2.07 | — | 13.7 |

TABLE 6-continued

|  | Run Number | | | | | |
|---|---|---|---|---|---|---|
|  | 1 | 2(C)[f] | 3(C) | 4(C) | 5 | 6 |
| Tear strength, kg/cm | 13.0 | 19.5 | 17.1 | 16.1 | 13.8 | 17.9 |

[a] See footnote a. of Table 4.
[b] See Agent "m" in Table 1 for composition.
[c] A commercial material.
[d] See Agent "n" in Table 1 for composition.
[e] See Agent "o" in Table 1 for composition.
[f] The agent used in this run was prepared like that described in Example 2 using propyl bromide instead of allyl chloride.
[g] This material was prepared as described in Example 1.

What is claimed is:

1. A composition comprising fluorocarbon elastomer gum and as a vulcanizing agent therefor a composition comprising one or a mixture of aromatic compounds having hydroxyl and oxyallyl groups directly bonded to aromatic ring-carbon atoms.

2. A composition comprising elastomeric copolymer gum of vinylidene fluoride and at least one terminally unsaturated monoolefin comonomer and as a vulcanizing agent therefor a composition comprising one or a mixture of aromatic compounds having hydroxyl and oxyallyl groups directly bonded to aromatic ring-carbon atoms.

3. The composition of claim 2 wherein said aromatic compounds are represented by the general formula

Ar(OR)$_n$ where Ar is a n-valent aromatic nucleus, each R is the same or different and is selected from the group consisting of a hydrogen atom and an allyl group, and n is a number from 1 to 4, with the proviso that if in a select compound of said formula n is 1, or if n is 2, 3, or 4 and each R is the same, then said vulcanizing agent composition comprises said select compound and at least one other compound of said formula which has at least one R that is different from the R of said select compound.

4. The composition of claim 2 wherein said aromatic compounds are represented by the general formula

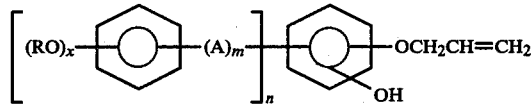

where R is a hydrogen atom or an allyl group, A is thio, oxy, sulfinyl, sulfonyl, or carbonyl moiety, or a divalent organic radical, x and y are zero, 1, or 2, and m and n are zero or 1, with the provisos: (1) that if (n+y) is at least 1 and if y is zero, then x is at least 1, and (2) that if in a select compound of said formula there is no hydroxyl substituent, then said vulcanizing agent composition comprises said hydroxyl-free select compound and at least one other compound within the scope of said formula having at least one hydroxyl substituent.

5. The composition according to claim 2 wherein said vulcanizing agent comprises a mixture of

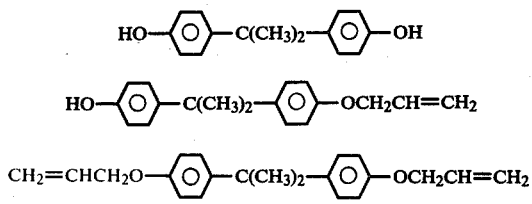

6. The composition according to claim 2 wherein said copolymer is a copolymer of vinylidene fluoride and hexafluoropropene.

7. The composition according to claim 2 wherein said copolymer is a copolymer of vinylidene fluoride, hexafluoropropene, and tetrafluoroethylene.

8. The composition according to claim 2 wherein the ratio of hydroxyl groups to oxyallyl groups in said vulcanizing agent composition is in the range of 0.3/1 to 10/1.

9. The composition according to claim 2 wherein the ratio of hydroxyl groups to oxyallyl groups in said vulcanizing agent composition is in the range of 0.7/1 to 2/1.

10. The composition according to claim 2 wherein said vulcanizing agent is present in said composition in the amount of 0.2 to 10 parts per 100 parts of said gum.

11. The composition according to claim 2 further comprising an organo-onium compound as a co-curing agent.

12. The composition according to claim 2 further comprising 0.1 to 5 parts of $(C_6H_5)_3(C_6H_5CH_2)P^+Cl^-$ per 100 parts of said gum.

13. The composition according to claim 2 further comprising carbon black, MgO, and $Ca(OH)_2$.

14. A composition comprising a copolymer gum of vinylidene fluoride and 15 to 50 mole percent of hexafluoropropene comonomer, 0.5 to 6 parts of a vulcanizing agent consisting essentially of a mixture of

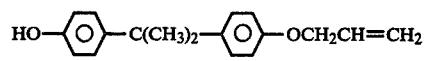
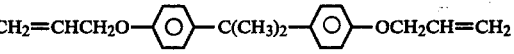

the ratio of hydroxyl groups to oxyallyl groups in said mixture being in the range of 0.7/1 to 2/1, 0.1 to 5 parts of $(C_6H_5)_3(C_6H_5CH_2)P^+Cl^-$, 0 to 100 parts of carbon black, 0 to 25 parts of MgO, and 0 to 25 parts of Ca(OH)$_2$, the sum of the latter two parts being 3 to 40.

15. A shaped article of a cured fluoroelastomer made by curing the composition of claim 2.

16. A process for vulcanizing a fluorocarbon elastomer gum, which comprises admixing with said gum as a vulcanizing agent therefor a composition comprising one or a mixture of aromatic compounds having hydroxyl and oxyallyl groups bonded directly to aromatic ring-carbon atoms.

17. The process of claim 16 wherein said gum is an elastomer copolymer gum of vinylidene fluoride and at least one terminally unsaturated monoolefin comonomer.

* * * * *

UNITED STATES PATENT AND TRADEMARK OFFICE
CERTIFICATE OF CORRECTION

PATENT NO. : 4,446,270

DATED : May 1, 1984

INVENTOR(S) : Richard A. Guenthner and David A. Stivers

It is certified that error appears in the above-identified patent and that said Letters Patent is hereby corrected as shown below:

Col. 17, line 47, "OH" should read -- $(OH)_y$ -- .

Signed and Sealed this

Fifth Day of March 1985

[SEAL]

Attest:

DONALD J. QUIGG

*Attesting Officer*     *Acting Commissioner of Patents and Trademarks*